United States Patent [19]
Wilden et al.

[11] Patent Number: 5,377,997
[45] Date of Patent: Jan. 3, 1995

[54] METHOD AND APPARATUS FOR RELATING MESSAGES AND ACTIONS IN INTERACTIVE COMPUTER GAMES

[75] Inventors: Mark A. Wilden, Oakhurst; Jonathan M. Hood, Coarsegold; Brian K. Hughes, Oakhurst; Jane S. Jensen, Oakhurst; Larry L. Scott, Oakhurst; Christopher F. Smith, Oakhurst, all of Calif.

[73] Assignee: Sierra On-Line, Inc., Oakhurst, Calif.

[21] Appl. No.: 950,084

[22] Filed: Sep. 22, 1992

[51] Int. Cl.⁶ .................. G09B 19/04; G11B 31/00
[52] U.S. Cl. .................................. 273/434; 273/437; 434/323
[58] Field of Search ............... 273/434, 435, 436, 437, 273/DIG. 28; 434/323

[56] References Cited

U.S. PATENT DOCUMENTS

| | | |
|---|---|---|
| 4,104,625 | 8/1978 | Bristow et al. |
| 4,460,342 | 7/1984 | Mills . |
| 4,569,026 | 2/1986 | Best ................................. 434/323 |
| 4,617,645 | 10/1986 | Sprague . |
| 4,692,941 | 9/1987 | Jacks et al. |
| 4,805,220 | 2/1989 | Sprague et al. |
| 4,852,168 | 7/1989 | Sprague . |
| 4,884,972 | 12/1989 | Gasper . |
| 4,968,257 | 11/1990 | Yalen ................................. 434/323 |
| 5,065,343 | 11/1991 | Knowles et al. ................... 434/323 |
| 5,111,409 | 5/1992 | Gasper et al. |

FOREIGN PATENT DOCUMENTS 1129640  8/1982  Canada .
2121587  12/1983  United Kingdom .

OTHER PUBLICATIONS

"Object-oriented Programming," by Rupert Baines, *Electronics & Wireless World*, Apr. 1989, pp. 370-374.

*Primary Examiner*—Jessica J. Harrison
*Attorney, Agent, or Firm*—Kolisch Hartwell Dickinson McCormack & Heuser

[57] ABSTRACT

The invented method is used in creating an interactive computer game to relate messages in the game to actions in the game. The game is designed for play on a computer system and the play of the game is controlled by software code stored in at least one code file in memory accessible by the computer system. The method includes the steps of producing a message to be communicated to a game player at the occurrence of a predefined action in the game, assigning an identifier to the message, storing the message in a message file that is separate from the code file, storing the identifier in the message file or in a message file title that is separate from the code file, incorporating in the software code the assigned identifier instead of the message itself, and inserting into the software code instructions to retrieve the message from the message file and communicate the message to the game player at the occurrence of the predefined action in the game by retrieving and communicating the message to which the identifier incorporated in the code is assigned. The invented apparatus is a software tool used in creating an interactive computer game that employs the invented method. The invented interactive computer game is produced by the invented method.

17 Claims, 13 Drawing Sheets

```
                    ┌─────────────────────────────────────────────────┐
                    │ [F]ILE  [E]DIT          C:\ABC.MSG ←146    ←148 │
                    │                                                 │
                    │      152                              160       │
                    │       ↓                                ↓        │
       162→  TOM   TALK   FIRST_TIME    1  TOM       HELLO ! I A      │
       164→  BUSH  LOOK                 1  NARRATOR  WHY LOOK TH      │
       166→  TOM   TALK   OTHER_TIME    1  TOM       I DON'T KNOW     │
       168→  OWL   TALK   WITH_CAMERA   1  CRAIG     DO YOU KNOW      │
       170→  OWL   TALK   WITH_CAMERA   2  OWL       YES. IN THE      │
       172→  INTRO                      1  NARRATOR  WELCOME TO       │
                    │       150↑         ↑         ↑                  │
                    │                   154       158                 │
                    │                            156                  │
                    │ [F1] HELP  [INS] ADD  [ALT-X] EXIT              │
                    └─────────────────────────────────────────────────┘

Fig. 13
```

METHOD AND APPARATUS FOR RELATING MESSAGES AND ACTIONS IN INTERACTIVE COMPUTER GAMES

TECHNICAL FIELD

This invention relates to computer games and, more particularly, to the design and manufacturing of interactive computer games.

BACKGROUND ART

Computer games are games played on computer systems. The computer systems typically include a microprocessor, a visual display, a sound generator and one or more input devices like a keyboard, joystick or mouse. The game displays images on the visual display and produces sound through the sound generator. The images and sounds depict the action of the game. A computer game may also be referred to as a simulation, video game or adventure game.

Computer games are controlled by software code executed by the computer system. Software code is simply a series of instructions specifying what images and sounds the computer produces, either automatically or in response to signals from a game player through the input device. Games are played by inputting signals in response to images or sounds generated by the game. The proper signal at the proper time produces a predefined action in the game. The software code includes instructions to recognize and respond to signals input by the game player through the user input device. The software code is typically stored in memory accessible by the computer system on devices like hard disks, floppy disks or CD-ROM disks.

In an interactive computer game, a person playing the game enters commands which affect the action and course of the game. For example, the game may have a main character and the game player may instruct the character to walk across the screen and look behind a rock. That action may result in the game player finding an object like a camera behind the rock, which can then be used later on in the game. Two different people can each play an interactive computer game very differently, with different sequences of events, depending on the actions taken by each player. Virtually any topic can be the subject of an interactive computer game, for example, ecology, flight simulation, science fiction, fantasy or history.

An interactive computer game starts as the idea of a game designer. The designer develops the concept, characters and major events in the game. Artists then produce storyboards, or pictures combining art and text, to illustrate the major scenes and actions in the game. Artists and animators draw the different scenes and events that will take place in the game. The drawings are then scanned into a computer where they are colored and shaded. The different drawings are then strung together to create the appearance of continuous motion. Music is also written and recorded for the game.

A script for the game is also prepared by writers, including messages that different characters or objects in the game may communicate to the person playing the game. The messages may take many forms, including written text displayed on a computer screen or an audio recording played to the game player by a sound generator.

Software programmers are the people who actually write the software code that controls the game. The programmers take the data defining the scenes, script and music, combine it with game commands that a player may use while playing the game, and write the actual code. The game is then tested and revised if necessary. After all that, the game is copied onto floppy disks, CD-ROM disks or other memory devices. The game is usually divided into separate files on the floppy disks. Files are distinct groups of information. For example, a code file would include software code and a music file would include music. The floppy disks or other memory devices are then packaged, usually with a game manual, and sold.

One of the difficult steps in creating an interactive computer game is to relate actions selected by a game player with messages that the game designer wants to communicate to the player when a predefined action is selected. For example, if a player selects one action, like looking behind a rock, then the game designer may want to communicate a message responsive to that action, like "There is a camera behind the rock!" If the player never looks behind the rock, then he never would find the camera. In the past the game designer had to inform the programmers about each message and the programmers had to include each message in the code controlling the game. If the designer subsequently changed the message, then the actual code controlling the game had to be changed.

This invention provides a new method and apparatus for relating messages and actions in interactive computer games. It allows the game designers to create and subsequently change messages, and relate the messages to predefined actions in the game, without requiring programmers to include the messages in the software code or to change the code. That allows creative individuals like writers to contribute to the game's creation without being skilled software programmers.

One of the primary advantages of the invented method is that it allows interactive computer games to be easily converted from text messages to audio messages, or vice versa, without any programmer intervention and without changing code. The method also allows messages, either text or audio, to be easily changed to different languages or to be changed for subsequent versions of the game. The method also helps reduce the time to debug or fix the game because it reduces the amount of code and because the messages are more accessible.

SUMMARY OF THE INVENTION

The invented method is used in creating an interactive computer game to relate messages in the game to actions in the game. The game is designed for play on a computer system and the play of the game is controlled by software code stored in at least one code file in memory accessible by the computer system. The method includes the steps of producing a message to be communicated to a game player at the occurrence of a predefined action in the game, assigning an identifier to the message, storing the message in a message file that is separate from the code file storing the identifier in the message file or in a message file title that is separate from the code file, incorporating in the software code the assigned identifier instead of the message itself, and inserting into the software code instructions to retrieve the message from the message file and communicate the message to the game player at the occurrence of the predefined action in the game by retrieving and communicating the message to which the identifier incorporated in the code is assigned.

The invented apparatus is a software tool used in creating an interactive computer game. The apparatus is used to assign an identifier to a message in the game so that the game may communicate the message to a game player at the occurrence of a predefined action. The apparatus is designed for use on a computer having a display screen and an input device. The apparatus comprises software code, stored in at least one code file in memory accessible by the computer system, for controlling the use of the apparatus, a visual display produced by the software code and displayed on the display screen when the apparatus is used, a first area within the visual display where a message to be communicated to a game player at the occurrence of a predefined action in the game may be produced by inputting the message through the input device, a second area within the visual display where an identifier identifying the message may be produced by inputting the identifier through the input device, and instructions within the software code for assigning the identifier to the message, for saving the message in a message file, and for saving the identifier in the message file or in a message file title.

The interactive computer game produced by the invented method includes software code, stored in at least one code file, for controlling the play of the game, including instructions to perform a predefined action during the play of the game, a message, stored in a message file that is separate from the code file, to be communicated to a game player at the performance of the predefined action, and an identifier assigned to the message and stored either in the message file or in a message file title and incorporated in the software code instead of the message itself. The software code further includes instructions to retrieve the message from the message file and communicate the message to the game player at the performance of the predefined action in the game by retrieving and communicating the messages to which the identifier incorporated in the code is assigned.

BRIEF DESCRIPTION OF THE DRAWINGS

FIG. 13 is another screen display from the invented apparatus showing numerous identifiers assigned to various messages.

DETAILED DESCRIPTION AND BEST MODE FOR CARRYING OUT THE INVENTION

Figure 1:
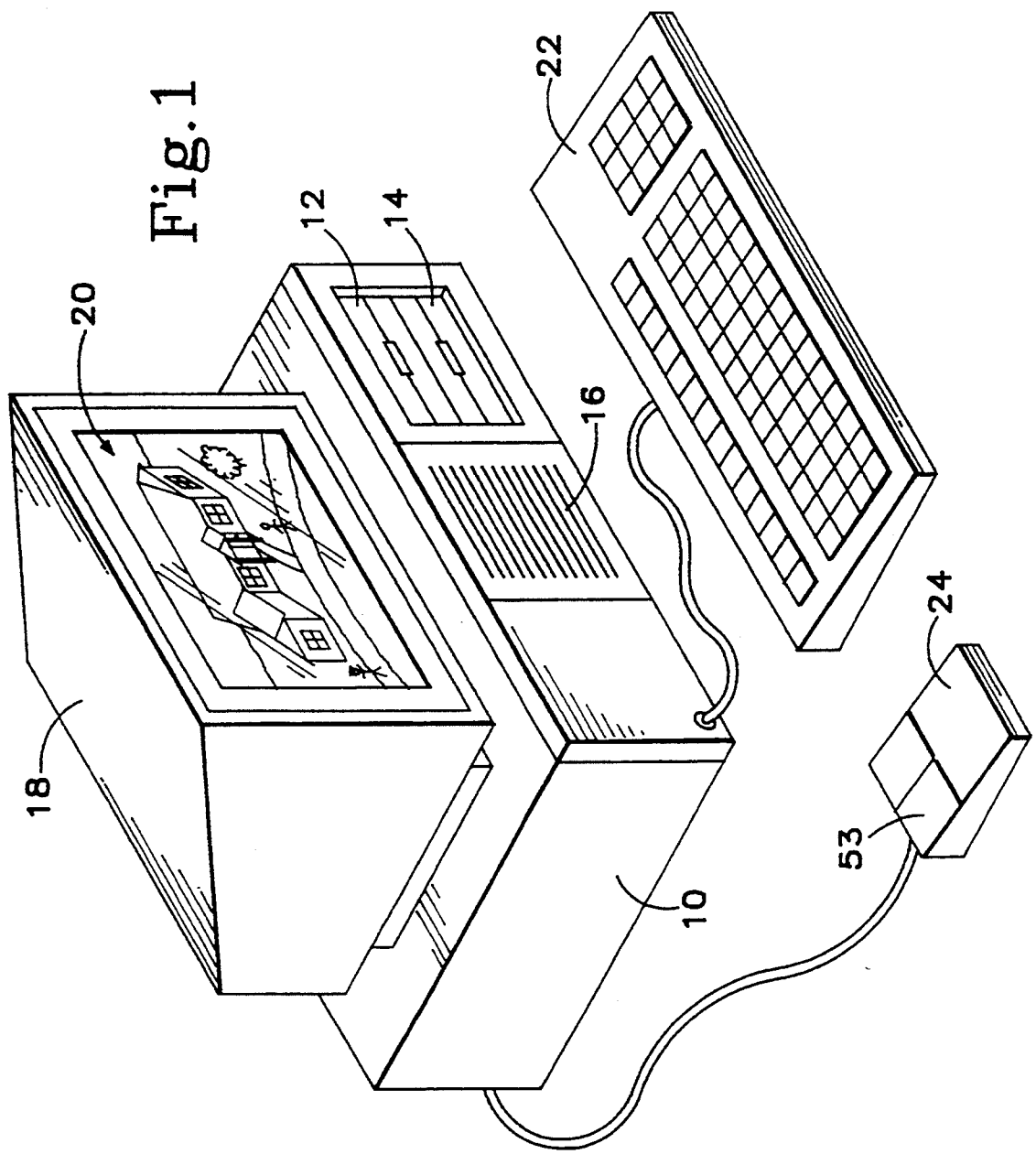
FIG. 1 is a simplified view of a computer system on which a game produced by the invented method may be played.

FIG. 1 shows a standard computer system on which a game player may play an interactive computer game. The computer system includes a microprocessor (not shown) within a housing 10. A floppy disk drive 12, a hard drive 14 and a sound generator 16 are included within housing 10. The computer system also includes a display screen 18 showing a visual display 20. The computer system includes a keyboard 22 and a mouse 24 for inputting signals into the computer. The microprocessor, floppy disk drive, hard disk drive, sound generator, display screen, keyboard and mouse are connected in any known manner, and constitute a standard computer system. The computer shown in FIG. 1 may be any of the standard systems currently available, including IBM, IBM compatibles, Apple and Amiga systems.

Figure 2:
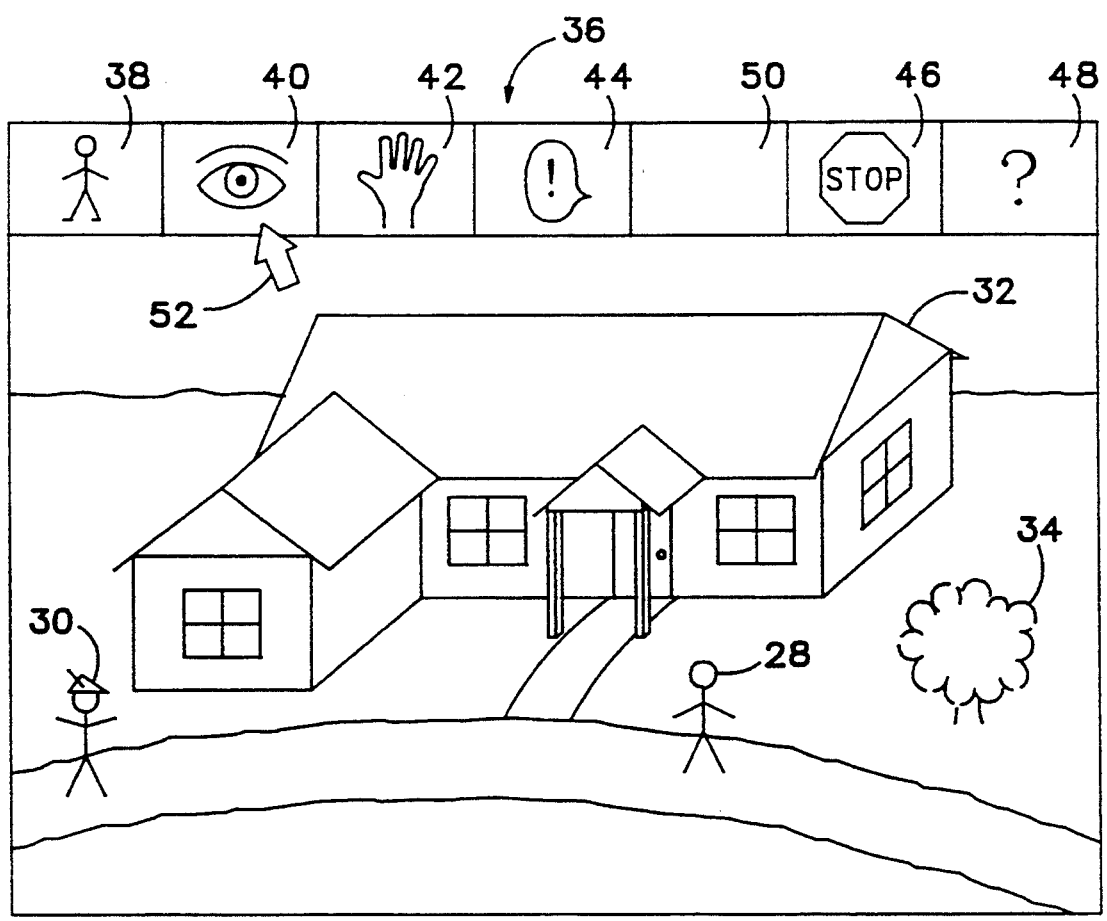
FIGS. 2–5 are screen displays from an interactive computer game.

Visual display 20 shown in FIG. 1 shows a scene from an interactive computer game. A similar but slightly changed and enlarged visual display is shown in FIG. 2. FIG. 2 shows a visual display 26 including a first character 28, a second character 30, a house 32 and a bush 34. In visual display 26, the game player is represented by person 28. The player plays the game by causing person 28 to perform various actions on the visual display. The actions may cause different visual images to be displayed or different messages to be communicated.

Across the top of display 26 is a horizontal row of icons called icon bar 36. An icon is simply a figure or symbol representing something. Icon bar 36 includes an icon 38 of a person walking, an icon 40 of an eye, an icon 42 of a hand an icon 44 of a dialog balloon with an exclamation point, an icon 46 of a stop sign and an icon 48 of a question mark. Box 50 in icon bar 36 is blank. An additional icon may be included in that box at a later point in the game. Of course, the position, number and appearance of icons may change from game to game.

The icons represent different operations the game player may take during the course of the game. Icon 38 represents "walking," icon 40 represents "looking," icon 42 represents "doing," icon 44 represents "talking," icon 46 represents "stopping the game," and icon 48 represents "asking for help." Icon bar 36 may appear and disappear throughout the game, depending on signals input by the game player.

A cursor 52 in the shape of an arrow is also shown in display 26. A cursor is a moveable symbol that indicates the position on the screen where the next user action will take place. The movement of cursor 52 is controlled by the game player through operation of either keyboard 22, mouse 24 or some other input device.

By pointing the cursor at one of the icons, the game player may select an operation to perform in the game. In display 26, cursor 52 points to eye icon 40. The user may select the operation "look" represented by icon 40 by inputting a signal when cursor 52 is pointing to icon 40 and touching the box containing icon 40. When using a mouse, the user inputs the signal by "clicking" button 53 (shown in FIG. 1) on the mouse. When using a keyboard, the user inputs the signal by striking one or more keys. In that manner, the player selects an operation. Typically, when the user selects an operation, the cursor will become the icon representing the selected operation. In other words, cursor 52 will change its appearance from an arrow to an eye.

Figure 3:
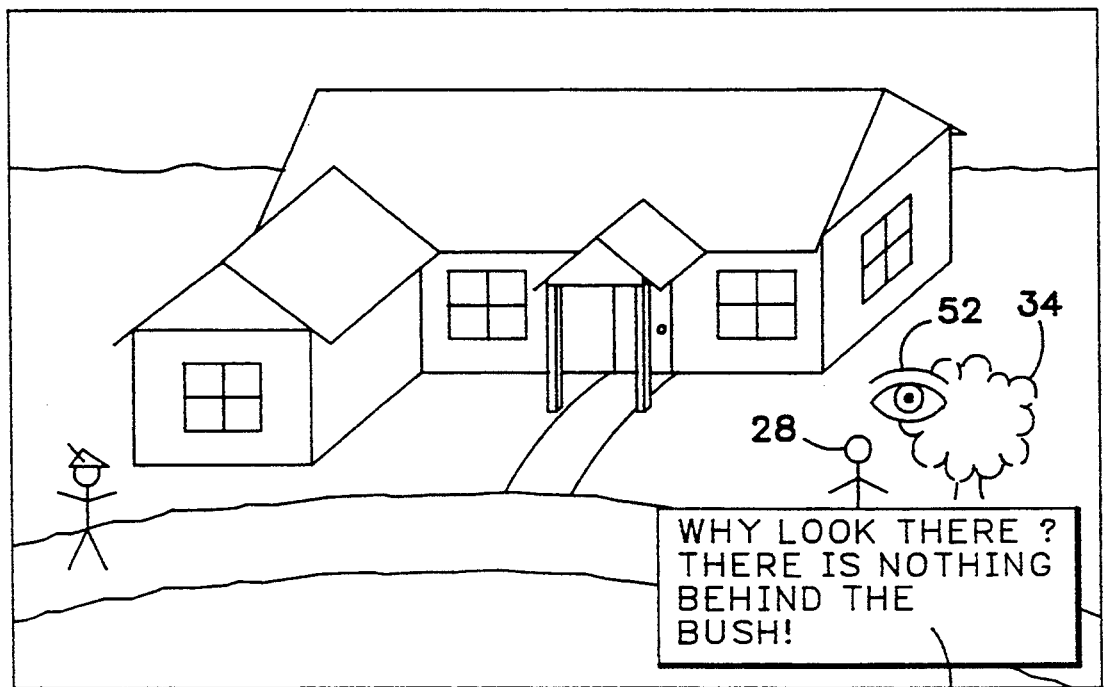

FIG. 3 is similar to FIG. 2 except icon bar 36 at the top of the display has disappeared. Additionally, cursor 52 has been moved and changed to eye icon 40. A message 54 is also shown in FIG. 3.

A player produced the display shown in FIG. 3 by selecting the "look" operation and then moving the cursor across the display until it was positioned above bush 34. The user then inputs a signal by clicking button 53 on mouse 24 (or striking one or more keys on keyboard 22), instructing the game to perform the operation associated with icon 40 on bush 34. In other words, when the icon was moved on top of the bush, and the appropriate signal was input into the computer, the game was instructed to perform the operation represented by the icon on the bush, namely, to look behind the bush. The game then "looked" behind the bush by seeing if a message was related to that action.

Performing an operation on an object, like looking behind the bush, is a predefined action taken by the game player. As shown in FIG. 3, that predefined action caused the game to communicate message 54 to the game player. In FIG. 3 the message is simply: "Why look there? There is nothing behind the bush!" The message is communicated as text in a box displayed on the screen. Alternatively, the message may be an audio recording produced by sound generator 16 or a combination of audio and text. This invention focuses on relating messages, like message 54, with actions, like looking behind the bush.

Character 28 is in a different position in FIG. 3 than in FIG. 2. The player moved character 28 into the new position by moving the cursor over icon 38 shown in FIG. 2 and inputting a signal to select that icon representing the "walk" operation. The cursor then changed into icon 38. The player then moved the icon to the position to which he wanted character 28 to walk, and then input a signal. That signal then caused character 28 to walk to the new position.

Figure 4:
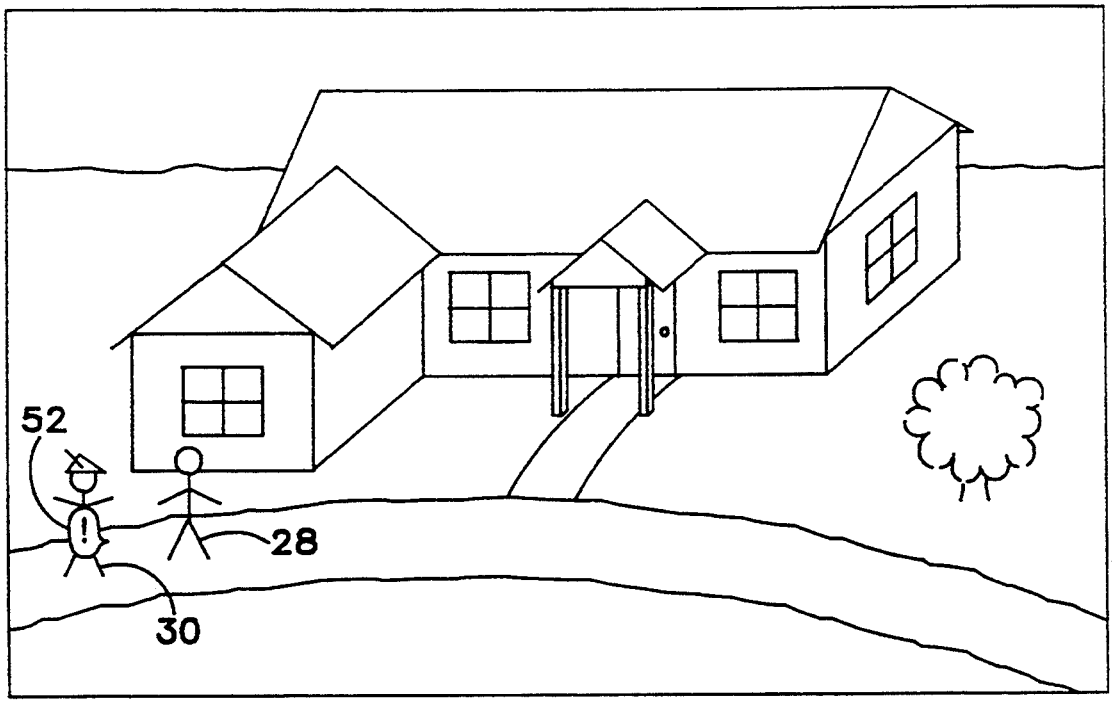

FIG. 4 is similar to FIGS. 2 and 3, except character 28 has moved, message 54 is gone, and cursor 52 has been changed to icon 44 of a dialog balloon with an exclamation point. Icon 44 represents the operation of "talking." Cursor 52 has also moved over second character 30 in FIG. 4.

Figure 5:
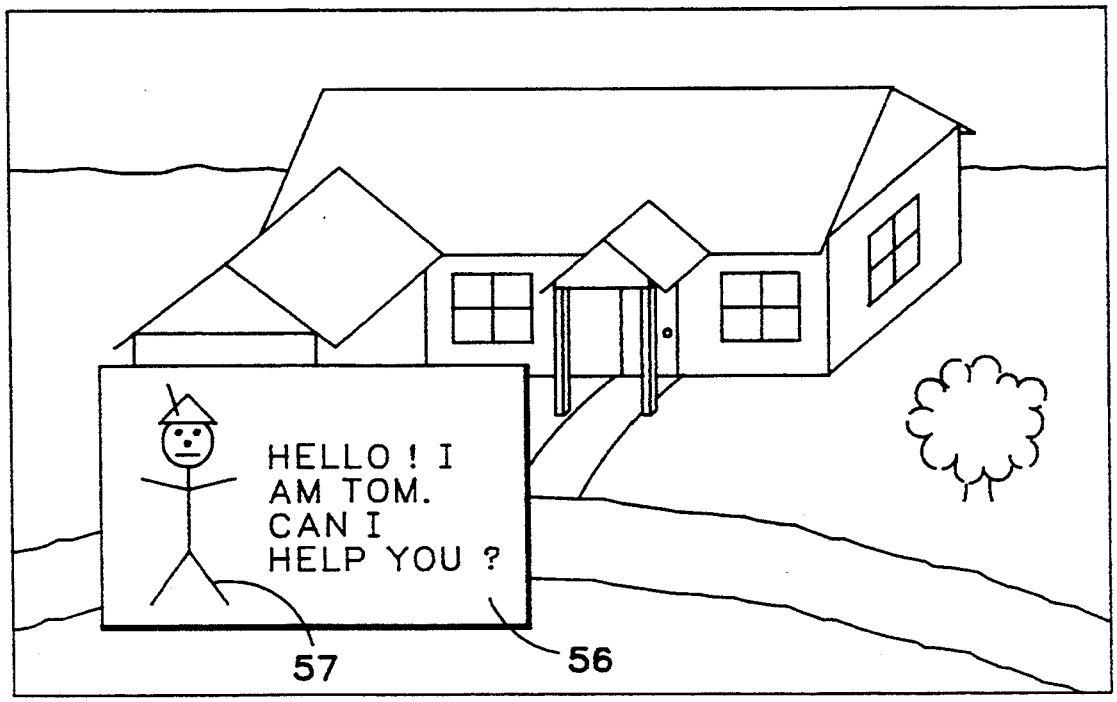

Positioning cursor 52 over character 30 and inputting a signal is another predefined action that may be taken during the game. As shown in FIG. 5 that action results in the communication of message 56. Message 56 is text displayed in a box on the screen. The text of message 56 is: "Hello! I am Tom. Can I help you?" A picture 57 of character 30 is also displayed in the box surrounding message 56. Picture 57 illustrates who in the game is communicating the message to the game player. In FIG. 3 message 54 did not include a picture of a person communicating the message to the game player because that message was communicated by the game narrator. Any character or narrator that communicates a message to the game player is called a "talker."

As illustrated by FIGS. 2-5, the game progresses by the game player performing different actions. Again, the actions are predefined operations performed on objects in the game. The operations are represented by the icons in icon bar 36. The objects in the game are all the objects shown on the screen. Each game may be programmed so that predefined combinations of operations and objects will be related to specific messages or default to specific messages.

The invented method is used in the creation of an interactive video game like the game depicted in FIGS. 2-5. The invented method may also be used in the creation of computer games that do not use icons and that are played differently. For example, voice recognition may be used instead of icons and a cursor. The method may be used in the creation of any game requiring the relation of messages and actions. The method is not used by a person playing a game.

Figure 6:
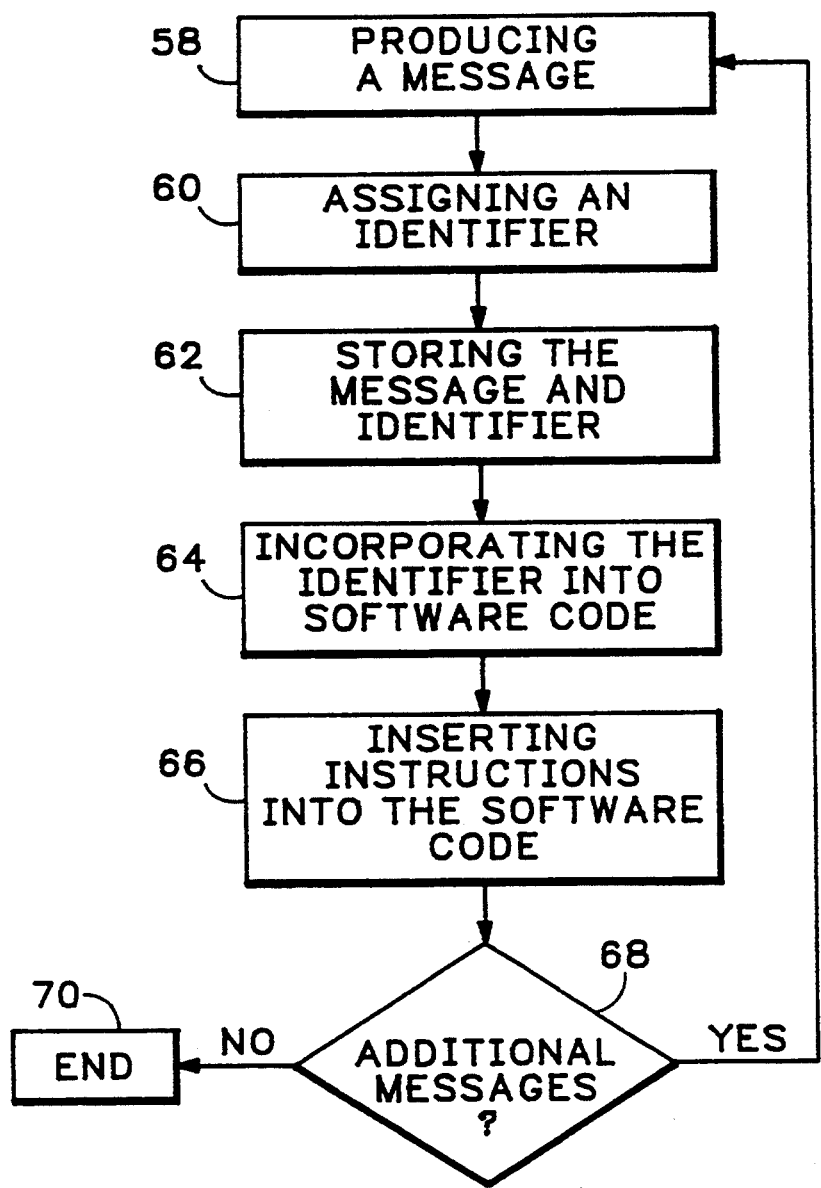
FIG. 6 is a flow chart of the invented method.

FIG. 6 is a flow chart of the invented method. The first step of the method, as shown by block 58, is to produce a message to be communicated to a game player at the occurrence of a predefined action in the game. The message is typically produced by the game designer or someone working with the game designer. The message may include text to be displayed on a display screen in a computer system, or an audio portion intended to be played on a sound generator in a computer system, or a combination of the two.

After the message is created, it is assigned an identifier, as shown at 60. The identifier is a number, name, title or signal distinguishing the message from all other messages. A single identifier may be both a name and a number if the name and number are defined as equivalent. In that case, the name may be used for human interaction and the number may be stored for use by a computer.

The invented method is especially beneficial if the identifier includes mnemonics. A mnemonic is a device that helps memory, or a symbol that is easy to remember. The identifier may include one mnemonic, but often includes more. For example, in the preferred embodiment, where a predefined action in an interactive computer game is an operation performed on an object in the game, the identifier includes a first mnemonic that identifies the object and a second mnemonic that identifies the operation. For the action displayed in FIG. 3, the first mnemonic may be "BUSH" and the second mnemonic may be "LOOK." Thus, message 54 displayed in FIG. 3 may be identified by the identifier "BUSH LOOK." The mnemonic that identifies the object is sometimes referred to as a "noun" and the mnemonic that identifies the object sometimes referred to as a "verb."

Mnemonics are important because often in an interactive computer game there are hundreds of messages. Using mnemonics allows the game designer, programmer and person producing the messages to easily remember which message is related to what action.

The identifier may also include a mnemonic that identifies a state of progression or "case" of the game. For example, if the person playing the game shown in FIG. 3 selected the eye icon, positioned it over bush 34 and input a signal a second time, then the message "You've already looked there!" may be displayed. That message may be identified by the identifier "BUSH LOOK OTHER_TIME". The mnemonic "OTHER_TIME" identifies the state of progression or case of the game, namely, that the game player has already looked behind the bush. The "_" symbol between the words "OTHER" and "TIME" simply means that two words are one mnemonic. If the identifier "BUSH LOOK OTHER_TIME" and its message exist, then the identifier related to message 54 may be modified to "BUSH LOOK FIRST_TIME," meaning that message 54 will only be communicated the first time the player looks behind the bush. Examples of case mnemonics include "FIRST_TIME", "SEEN_MONSTER" or "HAS_MONEY."

A game designer may want some actions in a game to trigger the communication of a series of messages. For example, in FIG. 5, message 56 may be followed with a message spoken by character 28 such as: "Yes. I am looking for a camera. Do you know where it is?" Character 30 may then respond by saying: "Yes, it is behind a rock down this path."

Each identifier for those messages is different because each identifier includes a sequence designation that identifies the order in which its respective message is to be communicated. Thus, message 56 displayed in FIG. 5 may be identified by the identifier "TOM TALK 1." In that identifier, "1" is the sequence designation and it indicates that it is the first message to be communicated when the game player talks to Tom. The subsequent messages would have identical noun and verb mnemonics, but they would include the sequence designations 2, 3 and so on.

Identifiers may include noun, verb and case mnemonics and a sequence designation. For example, if the identifiers are "BUSH LOOK FIRST_TIME" and "BUSH LOOK OTHER_TIME," and a sequence of messages is to be communicated when the player looks behind the bush a second time, then the identifiers for those messages would be "BUSH LOOK OTHER_TIME 1," "BUSH LOOK OTHER_TIME 2," and so on. By using sequence designations in identifiers, entire conversations involving as many talkers and messages as desired can be produced with one line of code.

An action may also be triggered by the software code itself instead of by the game player. For example, when the game begins, a series of actions may be automatically performed to introduce the game and the characters in the game. Messages may also be displayed in connection with the actions triggered by the software code. In that case, the identifiers assigned to the messages may include one or more mnemonics that simply identify the state of progression of the game. For example, one message may be identified by the mnemonic "INTRO," which would relate a message to an action in the introduction of the game. Those identifiers may also include sequence designations to identify the order in which the messages are to be communicated.

Returning to FIG. 6, the invented method then stores the message in a message file that is separate from the code file, and stores the identifier in a location that is also separate from the code file, as shown at 62. When the message is text, the identifier is typically stored in the message file itself. When the message is audio, the identifier is typically stored in a title to the message file because of the memory required for each audio message. Again, a mnemonic may be set equal to a number, and both or either of the mnemonic or number may be called the identifier. When the identifier is compiled for storage, the mnemonics are typically converted to numbers equal to the mnemonics.

The code file is where the software code controlling the game is stored. It may be on the same floppy disk as the message file and identifier location, but it is distinct from the message file and identifier location. That allows either file and/or identifier location to be edited, copied or changed without affecting the other. Of course, there may be one or more code files, message files and/or identifier locations, but all the message files and identifier locations will be separate from the code files.

As stated earlier, one of the benefits of maintaining the message files and identifier locations separate from the code files is that text messages can be easily changed to audio messages and vice versa in different versions of the game. It also allows for the computer game to be easily modified and translated into different languages. For example, to create a Japanese version of a computer game, the text and audio portions of the messages can be changed to Japanese. The identifiers would remain the same, therefore no changes to the code would be necessary. Because the messages (both audio and text) are maintained separate from the code, the messages would not have to be extracted from the code. Usually all that is required is to exchange the floppy disk with English messages with a floppy disk having foreign language messages.

Additionally, if the game is updated by replacing old messages with new messages, and stored on a CD-ROM disk, the update would be easier because the message file is separate from the code file. The new text and audio in new message files would simply replace the old text and audio in old message files. No changes to the code file would be required.

When the game is finished and recorded on floppy disks, the code files and message files may be compressed into a single file to save memory. However, the messages and message files are still distinct from the code.

At step 64 the method incorporates into the software code the assigned identifier instead of the message itself. At step 66 the method inserts into the software code instructions to retrieve the message from the message file and communicate the message to the game player at the occurrence of the predetermined action in the game by retrieving and communicating the message to which the identifier incorporated in the code is assigned. In other words, the identifier is included in the software code rather than the message, and when the code instructs the game to communicate a message, the message associated with the appropriate identifier is retrieved and communicated.

The software code into which the identifiers are incorporated and into which the instructions to retrieve and communicate the message are inserted may be written in many different programming languages. However, the invented method is particularly applicable for object-oriented programming. Object-oriented programming includes interacting but separate "objects" or software packages. Each object usually has it own data and code. The objects communicate with each other to accomplish the programming goal.

Steps 58 through 66 are performed for each message. Then step 68 inquires if there are additional messages. If so, the method returns to step 58. If not, the method ends at step 70.

Figure 7:
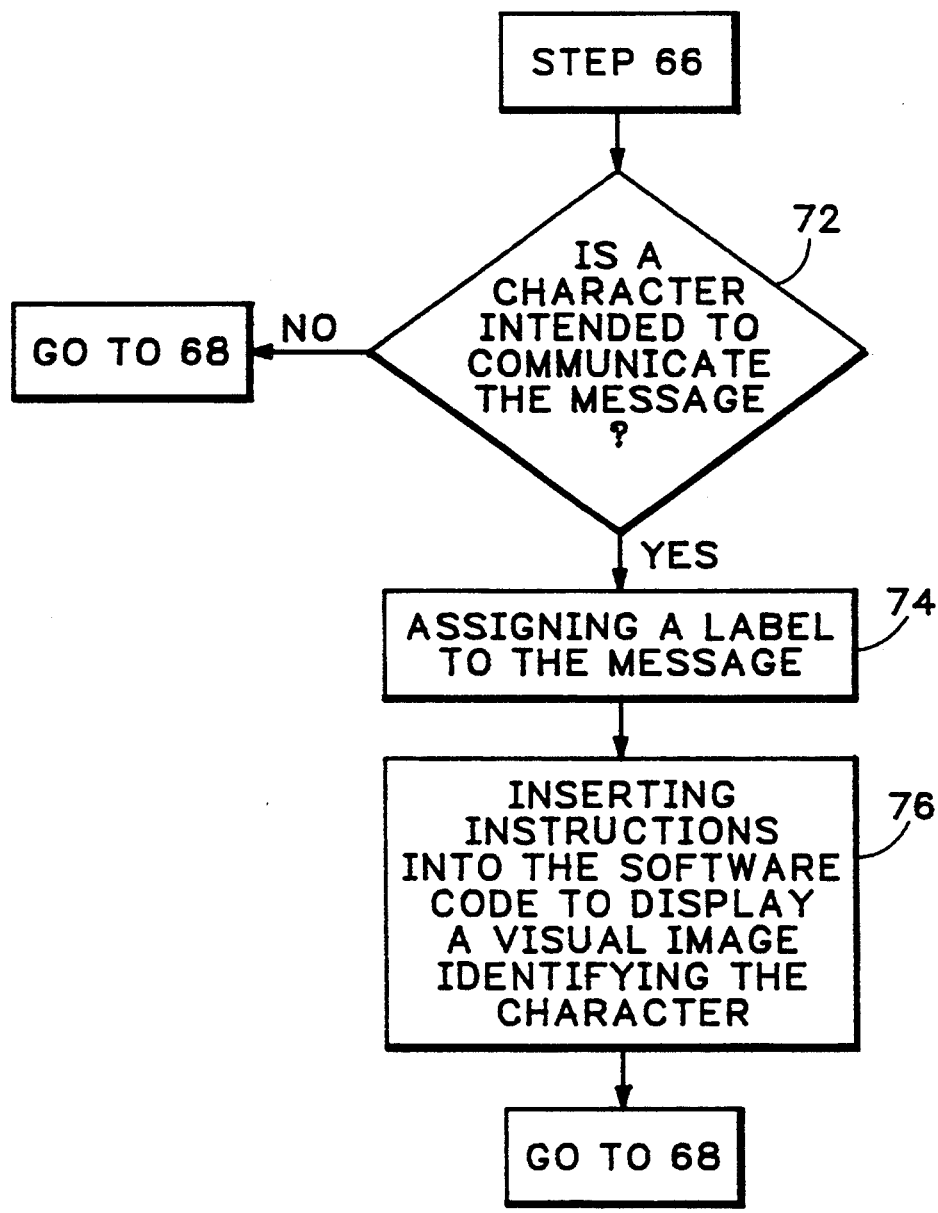
FIG. 7 is a flow chart of steps that may be added to the invented method.

If the method is used in creating an interactive computer game that includes a talker or a character intended to communicate a message to the game player, as shown in FIG. 5, then the method may include the additional steps shown in FIG. 7. The steps shown in FIG. 7 would be included into the steps shown in FIG. 6 between blocks 66 and 68.

Whether the game includes a talker is determined at 72. In making that determination, the game designer decides whether to display a visual image on the display screen that identifies the talker. The visual image may be a bust of the character, a complete representation of the character as shown in FIG. 5, or it may simply be a modification to the character already on the display screen, such as displaying different mouth and eye movements. If there is not a character intended to communicate the message by the display of a visual image identifying the character on the display screen, then the method proceeds to step 68. If there is such a message, then the method proceeds to step 74 where a label is assigned to the message to identify the talker. The label is usually the talker's name. For example, in FIG. 5 message 56 would be assigned the label "Tom." At step 76 instructions are inserted into the software code to display the visual image on the display screen that identifies the character intended to communicate the message when the message is communicated. The method then proceeds with step 68.

The invented method is often used by writers and game designers before the game's software code is actually written. Nonetheless, the method can also be used during and after writing code. That allows for a more flexible schedule during the creation of a game because different people can work at different times on different parts of the game.

Figure 8:
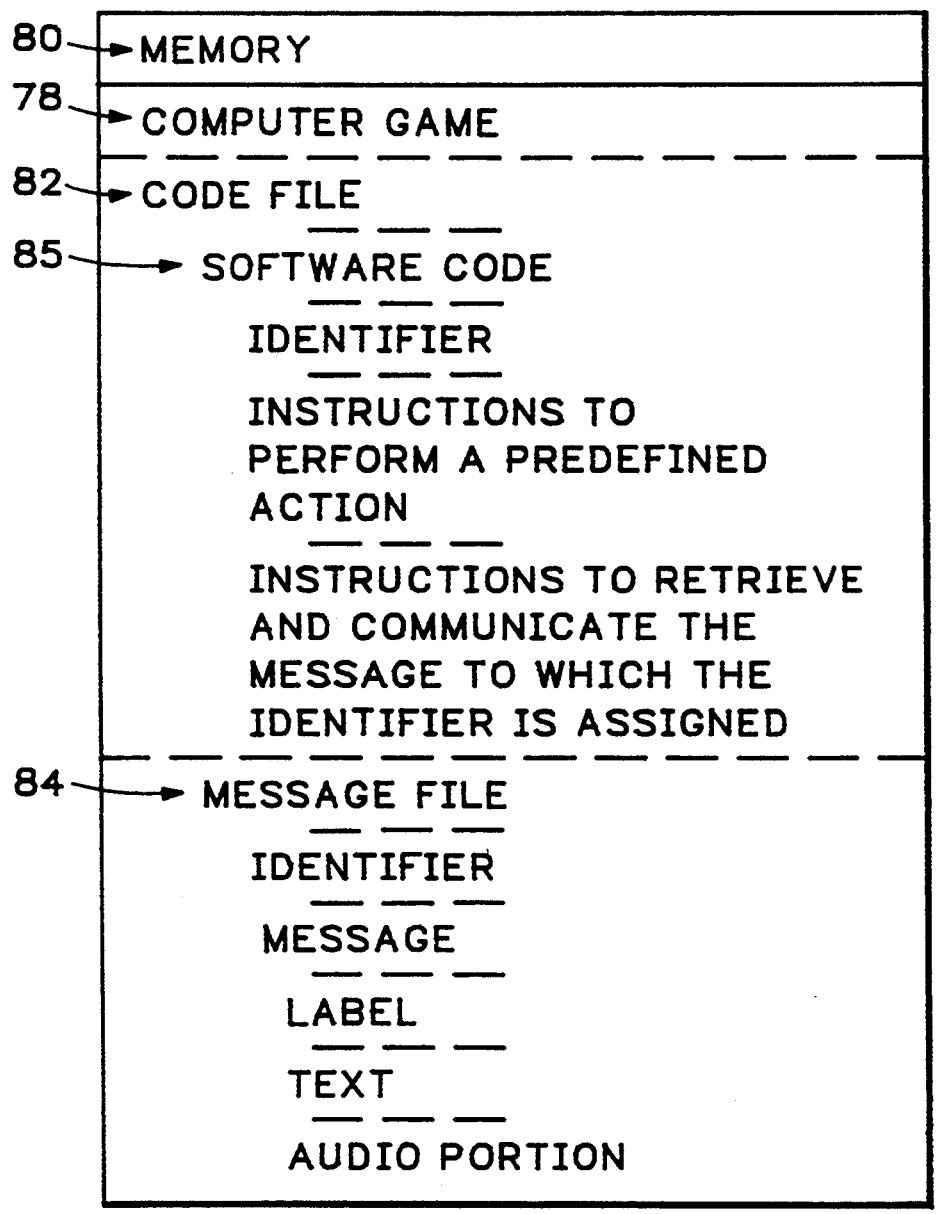
FIG. 8 is a representative drawing of a computer game produced by the invented method.

FIG. 8 is a representation of a computer game created with the invented method and it shows the relationship of message files and code files. The computer game is shown in FIG. 8 at 78, and is stored in memory 80. Again, memory 80 is typically one or more floppy disks or CD-ROM disks.

The computer game is divided into at least one code file 82 and at least one message file 84. The code file includes software code 85 to control the play of the game, an identifier assigned to a message, instructions to perform a predefined action, and instructions to retrieve and communicate the message to which the identifier is assigned. The message file shown in FIG. 8 includes the identifier, the message, including any text or audio portion, and a label identifying the message's talker, thus it is for a text message. For an audio message, the identifier is typically stored in the message file's title.

The invented method is embodied in an apparatus or software tool used by a game designer to produce the messages and assign identifiers to the messages. The apparatus is not a computer game.

Figure 9:
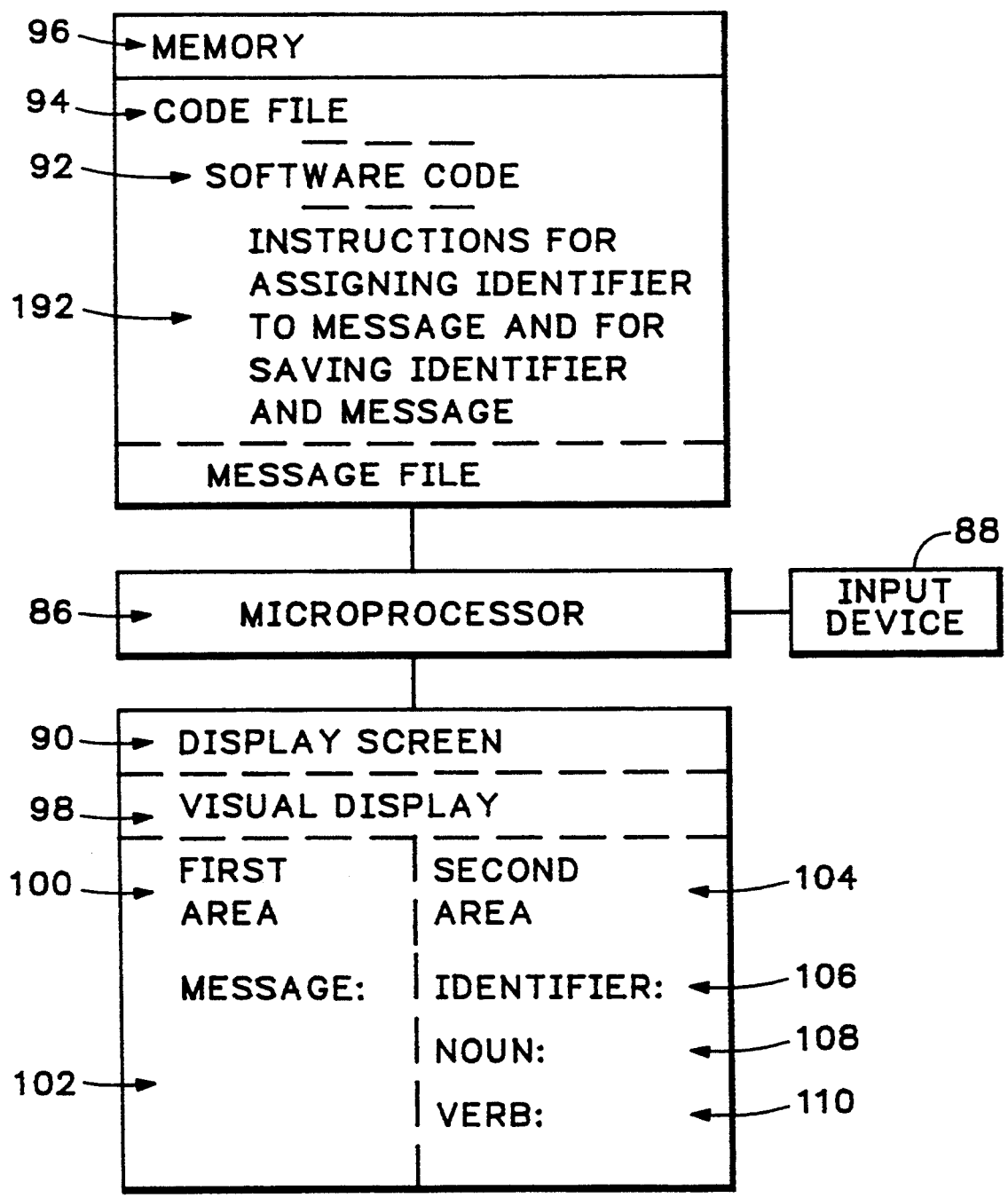
FIG. 9 is a block diagram of the invented apparatus for relating messages and actions.

FIG. 9 is a block diagram of both the invented apparatus or software tool and the computer system on which the apparatus is designed for use. The computer system includes a microprocessor 86, an input device 88 and a display screen 90. The computer system represented by blocks 86, 88 and 90 in FIG. 9 is like the computer system shown in FIG. 1. The invented apparatus includes software code 92 stored in a code file 94 in memory 96 accessible by microprocessor 86. Software code 92 controls the invented apparatus. Software code 92 is different than software code 85 in FIG. 8 because it controls the invented apparatus, not an interactive computer game. Software code 92 produces a visual display 98 on display screen 90. Visual display 98 includes a first area 100 where a message to be communicated to a game player at the occurrence of a predefined action in the game may be produced by inputting the message through input device 88. In FIG. 9, the message itself may be input on the visual display at 102.

Visual display 98 also includes a second area 104 where an identifier identifying the message may be produced by inputting the identifier through input device 88. In FIG. 9, the area in which the identifier may be produced is identified at 106. As explained above, the identifier may include mnemonics that represent operations performed on objects in the game. Second area 104 in visual display 98 may include the word "noun," as shown at 108, to prompt the production of a first mnemonic identifying the object on which the operation is performed. Second area 104 may also include the word "verb" to prompt the production of the second mnemonic identifying the operation, as shown at 110.

FIGS. 10-14 show visual displays produced by software code 92 of the apparatus. The apparatus has some characteristics of a word processor in that it allows a user to input and edit a message.

Figure 10:
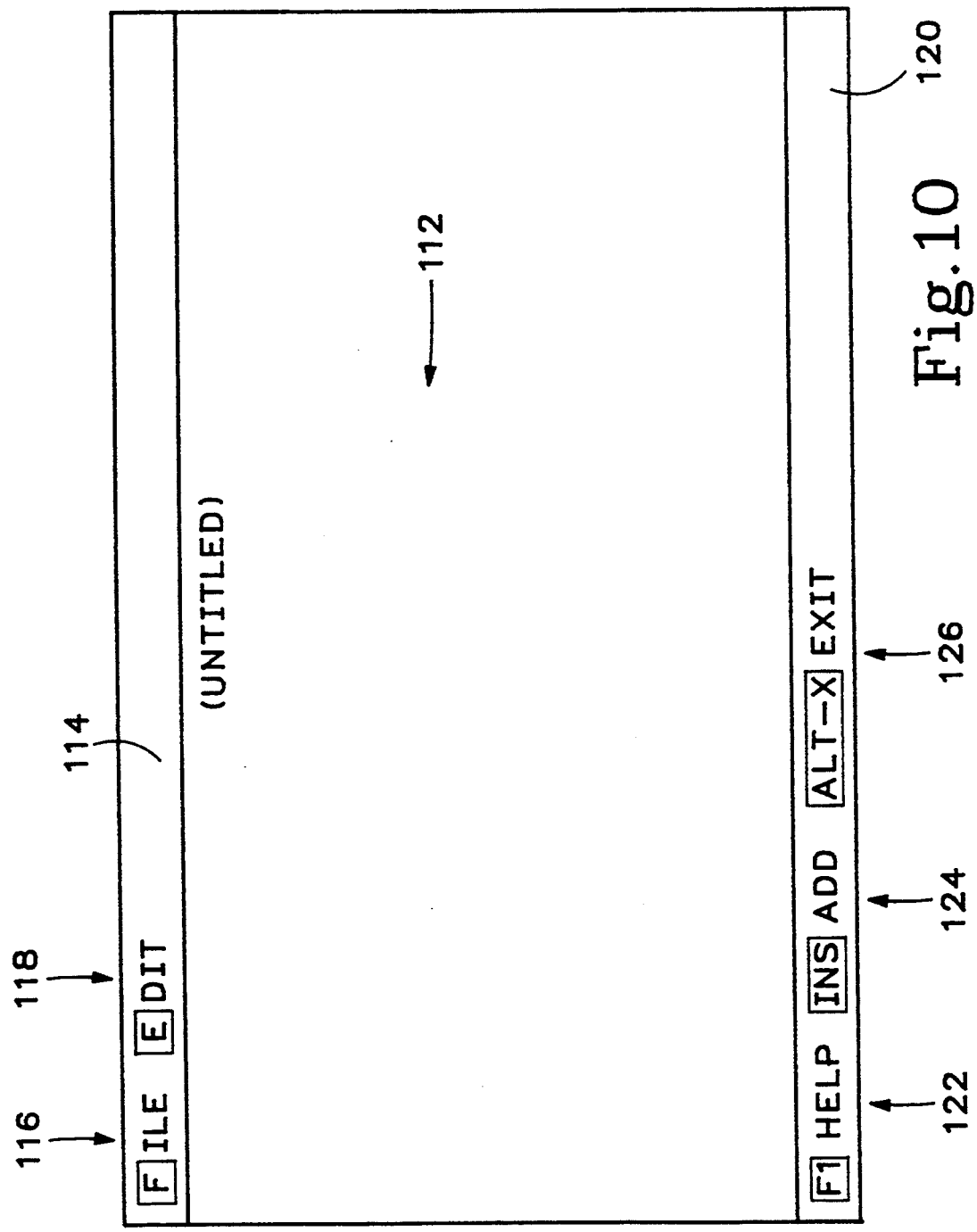
FIGS. 10–12 are screen displays from the invented apparatus.

FIG. 10 is the first screen shown by the apparatus when the apparatus is used to create messages and identifiers. FIG. 10 includes a large, blank area at 112 in which the messages and identifiers may be displayed. In FIG. 10 there is nothing shown in area 112 because a message file has not been created or retrieved for editing. The fact that a message file has not been created or retrieved for editing is identified by the phrase "(untitled)" in the upper center of area 112.

Above area 112 is a bar 114 which includes the commands for performing various functions with the apparatus. Bar 114 includes the words "FILE" and "EDIT," as shown at 116 and 118, respectively. As is common in many software tools, the "F" in the word "FILE" and the "E" in the word "EDIT" are highlighted or boxed so that those functions may be performed by striking the "F" or "E" key, respectively, on a keyboard.

Along the bottom of area 112 is another bar, labeled 120. Bar 120 is a status or help bar that displays various commands that can be executed by striking predetermined keys on a keyboard. For example, bar 120 displays the word "HELP" at 122. That word means that help in using the apparatus is available by striking the "F1" key on the keyboard. Bar 120 also includes the word "ADD" at 124. That word means that new messages may be added by striking the "INS" or insert key on the keyboard. Bar 120 also includes the word "EXIT" at 126, which means that the apparatus can be exited by striking the "ALT" and "X" keys simultaneously on the keyboard.

Figure 11:
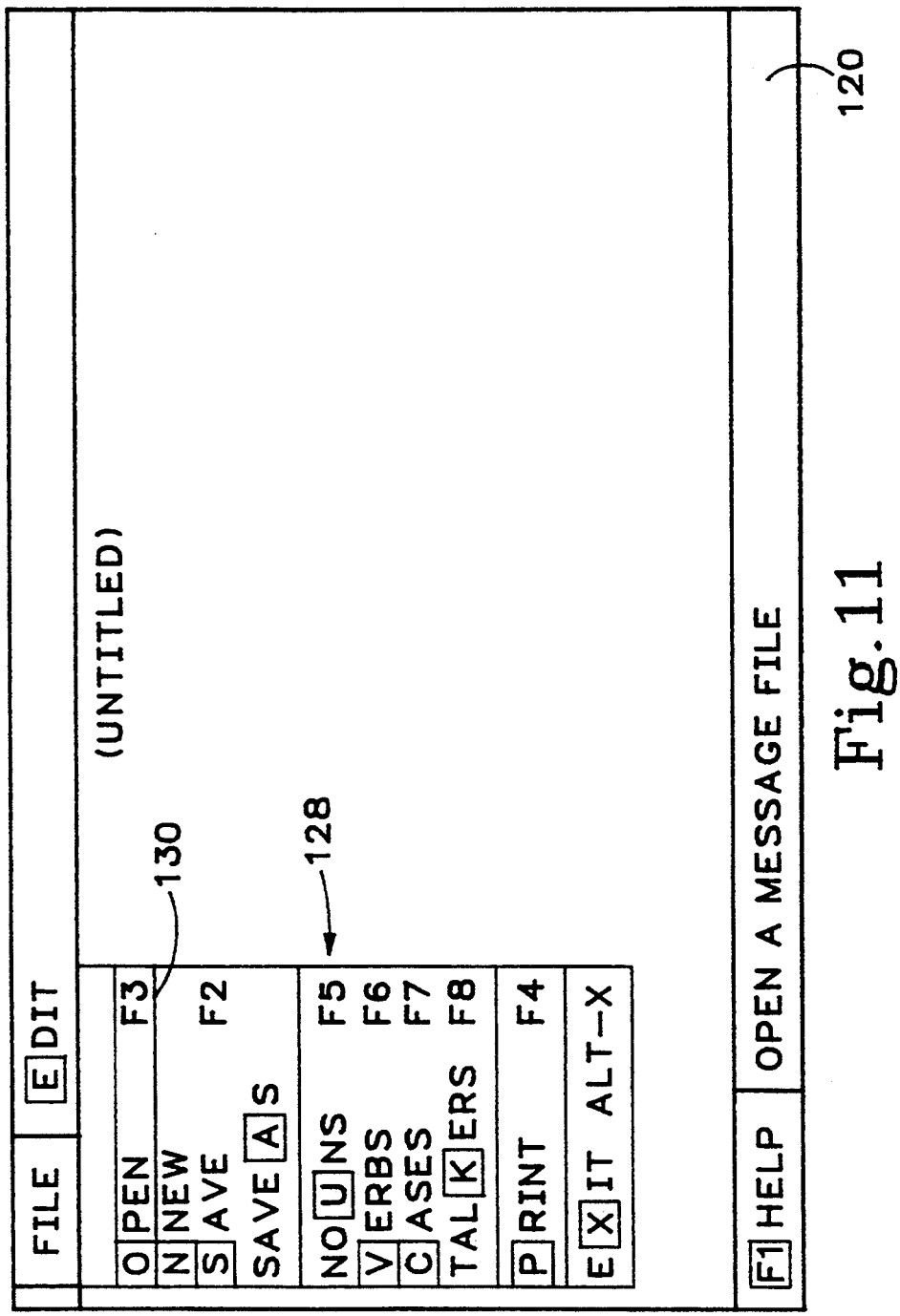

FIG. 11 is similar to FIG. 10 except that the "FILE" function has been selected and a menu 128 was produced. That menu displays several other functions that can be performed by the apparatus. The first function listed is "OPEN" which means to open a message file for editing or adding messages and identifiers. That function can be performed by striking either the "O" key, as shown by the fact that the "O" key is surrounded by a box, or the "F3" key. In FIG. 11 the entire phrase "OPEN F3" is surround by a box 130. Box 130 signifies that the "OPEN" function is highlighted and also may be performed by striking the enter key on a keyboard or clicking with a mouse.

Menu 128 also includes a "NEW" command which allows a user to create a new message file, a "SAVE" command which allows a user to save any changes made to a message file, and a "SAVE AS" command which allows a user to save any changes made to a message file as a new message file. Menu 128 further includes the functions "NOUNS," "VERBS," "CASES," and "TALKERS." By striking the respective, highlighted letters or function keys, or by highlighting the commands and striking the enter key on a keyboard, the user of the apparatus can list the nouns, verbs, cases and talkers, respectively, in a message file.

As explained above, the nouns are the mnemonics that identify objects in the game, the verbs are the mnemonics that identify operations performed on the objects in the game, the cases are the mnemonics that identify different states of progression of the game and the talkers are labels that identify the characters intended to communicate different messages.

Menu 128 also includes a "PRINT" command and an "EXIT" command to either print information from a message file or to exit and stop using the apparatus. Bar 132 at the bottom of FIG. 11 explains the function of the highlighted command. In FIG. 11 the "OPEN" command is highlighted by box 130 and therefore bar 132 displays a message explaining what the "OPEN" command does. Bar 132 also shows that help may be obtained by striking the "F1" key.

Figure 12:
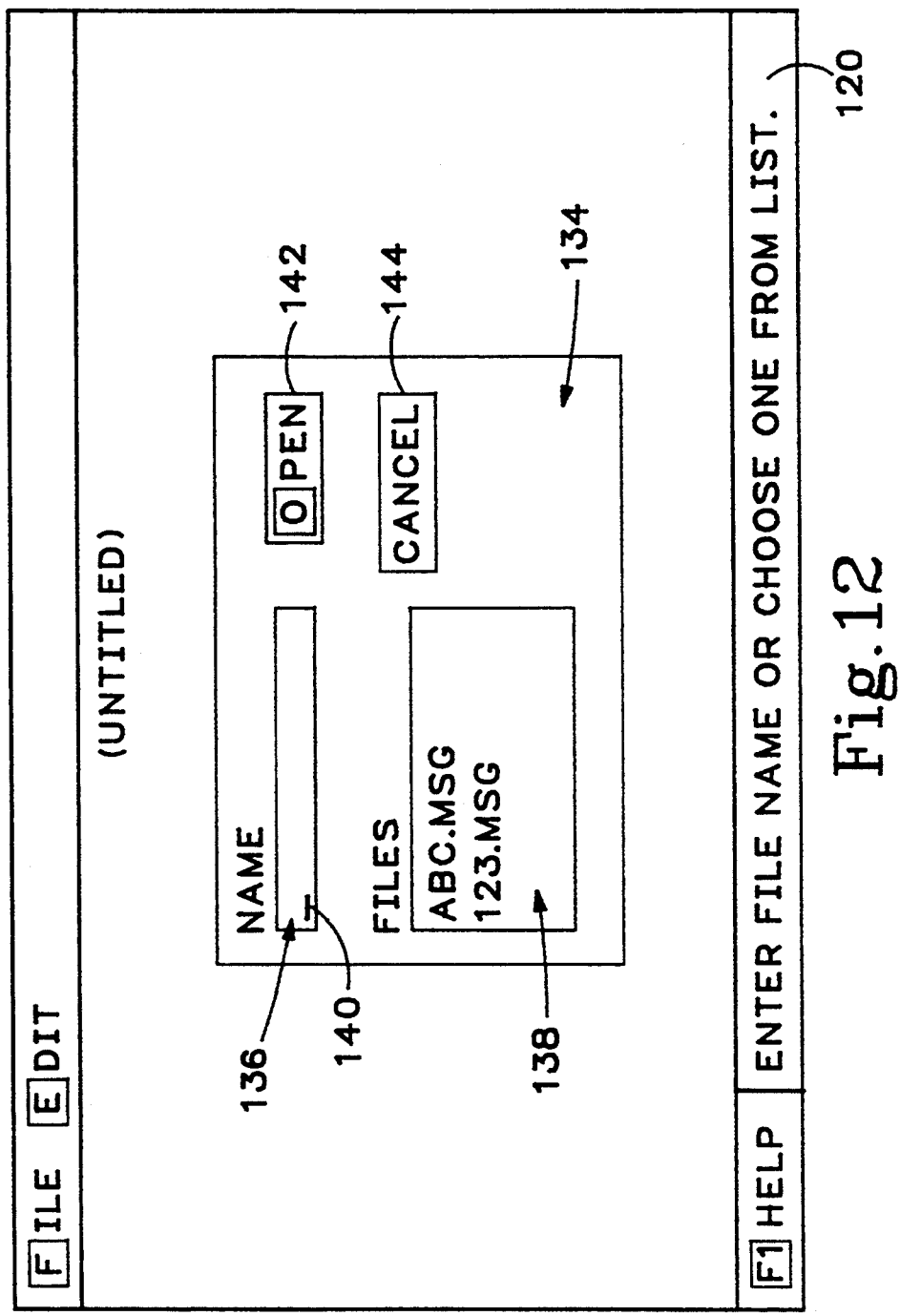

FIG. 12 shows the screen resulting from executing the "OPEN" command. FIG. 12 shows a window 134 that includes an area 136 in which the name of the message file to be opened can be input. Area 138 in window 134 lists two message files accessible by the apparatus, one identified "ABC.MSG" and the other identified "123.MSG." The name of a message file can be typed in at area 136 by using a keyboard or the file name can be selected from the list displayed in area 138.

Cursor 140 is displayed in area 136 to prompt the user to input the name of the message file to be opened. Bar 120 at the bottom of the screen displayed in FIG. 12 also prompts the user to input a message file name. When the name is input, the file may be opened by striking the "O" key or by highlighting and entering the word "OPEN" at 142. Cursor 140 can be moved to the word "OPEN" by moving a mouse or using a keyboard. If the user makes a mistake, the command may be cancelled by highlighting and entering the word "CANCEL" at 144.

FIG. 13 shows the results of opening the "ABC.MSG" file listed in FIG. 12. The name of the file is shown at 146 and the messages and identifiers contained in that file are displayed at 148.

The messages and identifiers displayed at 148 are divided into six columns. Column 150 lists objects or nouns in the game. Column 152 lists operations or verbs that may be performed on the objects in the game. Column 154 lists states of progression or cases of the game, column 156 lists sequence designations, column 158 lists talkers and column 160 lists the messages. The uppermost entry in columns 150, 152, 154 and 156 constitute the identifier for the upper-most message in column 160. That identifier is "TOM TALK FIRST$_{13}$TIME 1." The talker for that message is "TOM," the upper-most label in column 158. Only the first part of the upper-most message in column 160 is shown. Thus, horizontal row 162 includes a message, its assigned identifier and a label indicating the character intended to communicate the message.

Similarly, horizontal row 164 includes a message, identifier, label and message. The case mnemonic for that identifier, however, is blank, meaning that the state of progression is not important for that message.

Horizontal row 166 also includes a message, its assigned identifier and label. The identifier in row 166 is similar to the identifier in row 162, except the case is different. The message in row 162 will be communicated the first time the player "TALKS" to "TOM" and the message in row 166 will be communicated every other time the player "TALKS" to "TOM."

The identifiers in rows 168 and 170 are similar, except for the sequence designation. Those two identifiers are assigned to messages that will be communicated to the game player when the player "TALKS" to an "OWL" in the game after the player has found a camera. The message in row 168 will be communicated first and the message in row 170 will be communicated second.

Row 172 includes a message that will be communicated to the game player automatically in the game introduction. In other words, the message in row 172 is triggered by the software code controlling the game. That message will be communicated when the code retrieves and communicates the message to which the identifier "INTRO 1" is assigned. That message will be spoken by the "NARRATOR."

Figure 14:
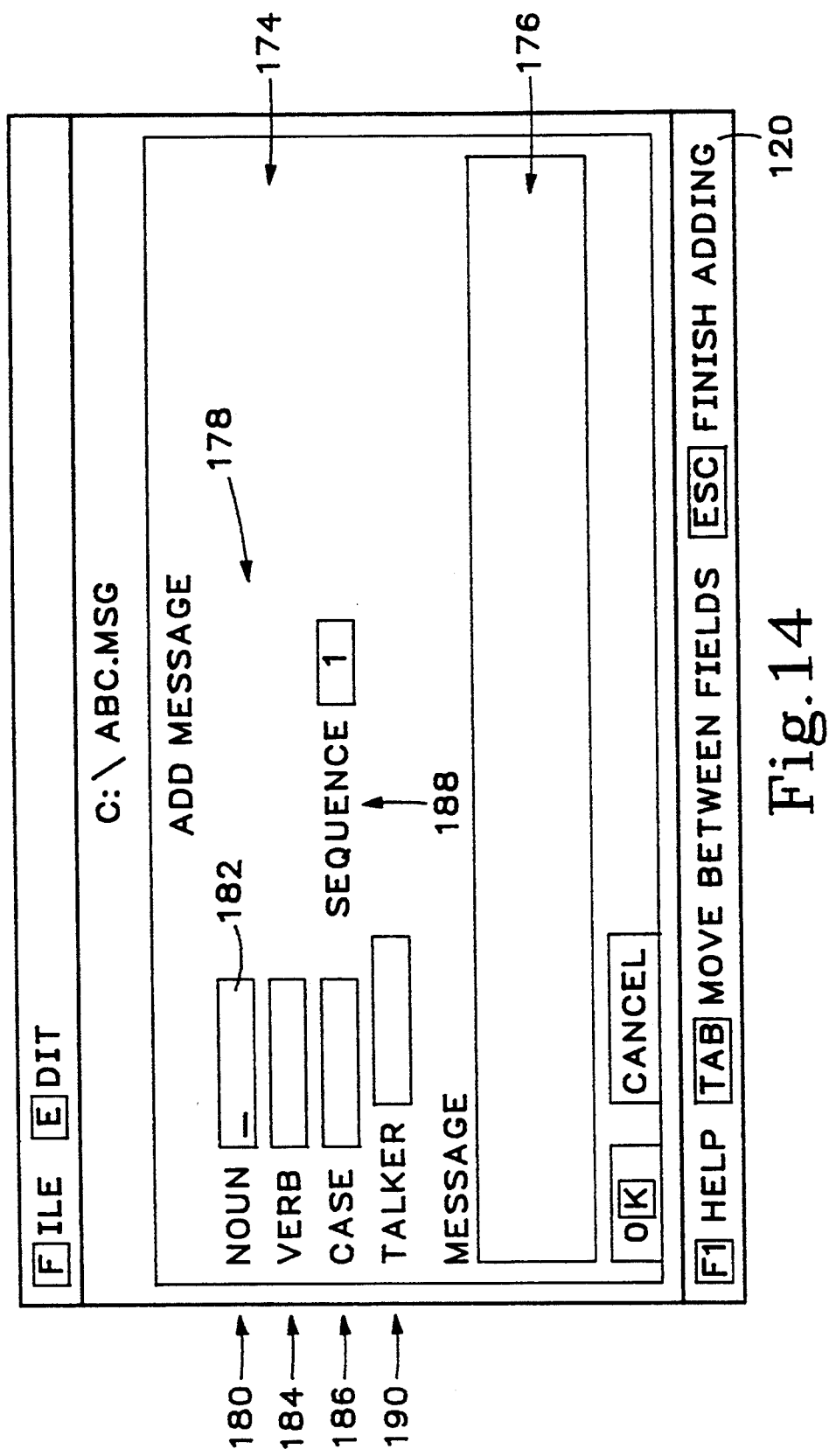
FIG. 14 is another screen display from the invented apparatus showing areas for inputting the message and the identifier.

FIG. 14 shows a screen of the invented apparatus at which new messages and identifiers may be produced. That screen includes a visual display 174 produced by software 92 code and titled "Add Message." Visual display 174 includes a first area 176 where a message to be communicated to the game player at the occurrence of a predefined action in the game may be produced by inputting the message through the input device. The message is usually typed in when the cursor is within area 176.

Visual display 174 also includes a second area 178 where an identifier identifying the message may be produced. Area 178 includes the word "Noun" at 180 to prompt the input of a first mnemonic to identify an object on which an operation will be performed to produce an action. The mnemonic is actually input at 182. Area 178 also includes the word "Verb" to prompt the input of a second mnemonic to identify the operation to be performed on the object. Area 178 also includes the word "Case" at 186 to prompt the input of a mnemonic identifying a state of progression of the game, and the word "Sequence" at 188 to prompt the input of a sequence designation. As shown in FIG. 14, the sequence designation defaults to "1."

Display 174 also includes the word "Talker" at 190. That prompts the input of the label identifying the character intended to communicate the message.

When the talker, message, noun and any other desired mnemonic is input, the user highlights and enters the word "OK" at the bottom of display 174, or strikes the "K" key to add that message and identifier. If the user made a mistake in inputting the information, the user would highlight and enter the "CANCEL" command at the bottom of display 174. Bar 120 at the bottom of the screen indicates various commands that may be used while adding messages. Display 174 is used for each message added.

Messages and identifiers may be edited with any standard word processing features. Those features may be accessed in the invented apparatus by selecting the "Edit" command shown in FIGS. 10 and 11.

As shown at 192 in FIG. 9, the software code of the invented apparatus includes instructions for assigning the identifier to the message file and for saving the identifier and the message. Thus, the apparatus embodies the method illustrated in FIGS. 6 and 7 and produces the message file shown at 84 in FIG. 8.

Figure 15:
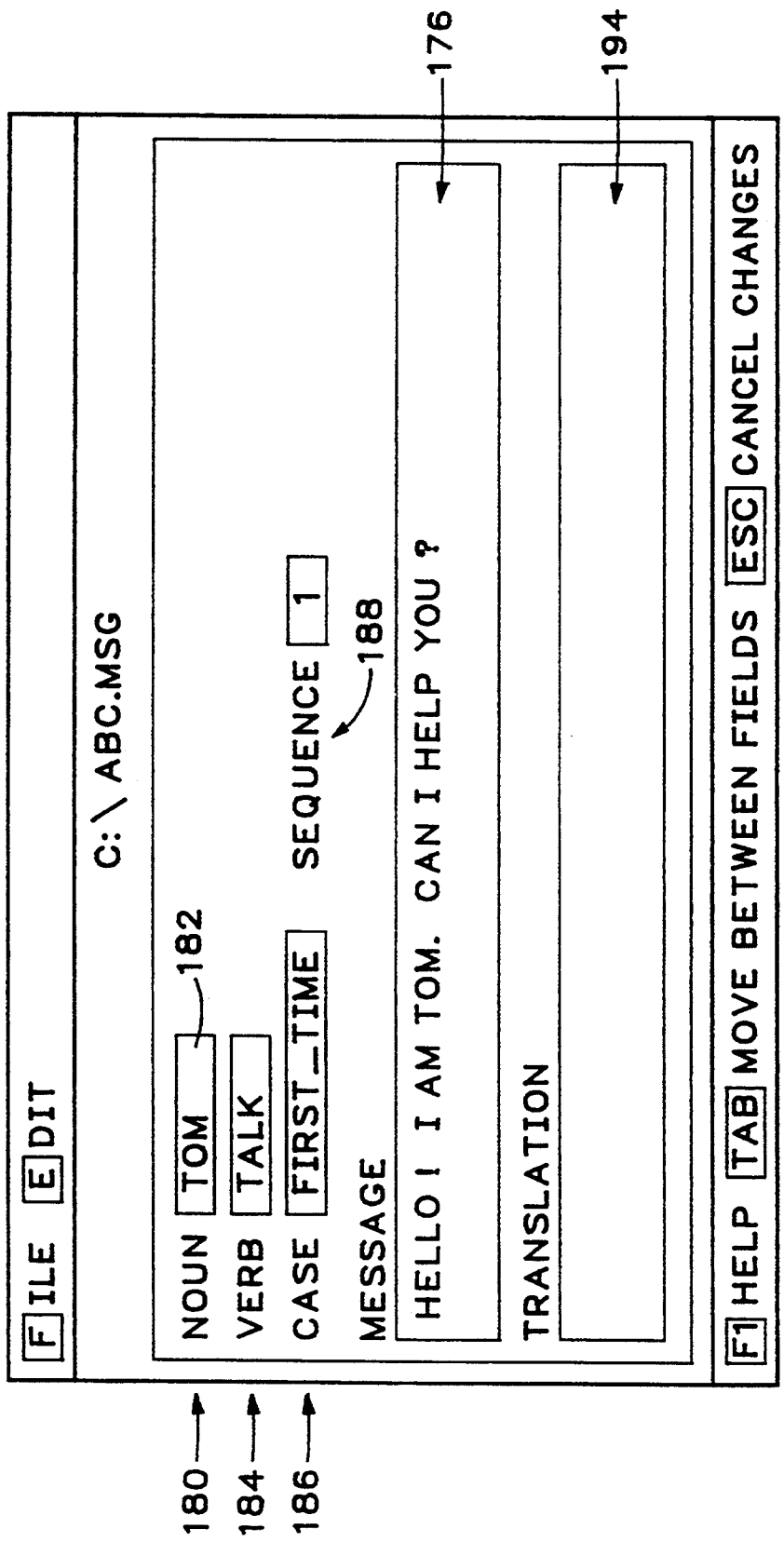
FIG. 15 is another screen display from the invented apparatus showing an area for translating messages.

FIG. 15 shows another screen of the invented apparatus at which messages may be translated into different languages. FIG. 15 includes the word "Noun" at 180. In this case, the noun is specified as "TOM." The word "Verb" is shown at 184 and is "TALK." The word "Case" is shown at 186 and is the mnemonic "FIR- ST_TIME." The sequence is shown at 188 and identified as "1." The screen shown in FIG. 15 also includes first area 176 in which a message assigned to the specified identifier is displayed. Beneath area 176 is a translation area 194. In translation area 194, a user may translate the message displayed in area 176 into different languages. Thus, use of the invented apparatus allows games to be translated easily into different languages by inputting data through a user input device like a keyboard. During translation, the message file containing the messages displayed in area 176 is separate from a translation file in which the translations will be stored. During translation many features of the invented apparatus described above are deactivated because they are unnecessary.

Of course, additional features and different screen displays may be included in the invented apparatus without departing from the invention.

INDUSTRIAL APPLICABILITY

The invented method, apparatus and game are applicable to the computer game industry. While preferred embodiments and best modes of the invented method, apparatus and game have been disclosed, variations may be made thereto without departing from the spirit of the invention.

We claim:

1. A method of implementing an interactive computer game designed for play on a computer system having a display screen, an input device, and a cursor displayed on the display screen and controlled at least in part by the input device, the method comprising:

providing memory accessible by the computer system, where the memory includes a code file and a message file that is separate from the code file;

storing, in the code file, software code which defines the play of the game, which causes objects to be displayed graphically on the display screen, which defines operations a game player may perform during the game, and which allows the game player to perform a predefined action in the game by selecting an operation, positioning the cursor adjacent an object on the display screen and then inputting a predetermined signal through the user input device to perform the selected operation on the object;

storing, in the message file, a message to be communicated to the game player at the occurrence of the predefined action in the game, where the message communicates information concerning the object associated with the predefined action;

assigning an identifier to the message to distinguish the message from other messages and to relate the message to the predefined action by incorporation of the assigned identifier in the software code; and retrieving the message from the message file and communicating the message to the game player at the occurrence of the predefined action in the game by retrieving and communicating the message to which the identifier incorporated in the code is assigned.

2. The method of claim 1 where the message includes text to be displayed on the display screen, and the location where the assigned identifier is stored is in the message file.

3. The method of claim 1, where the computer system includes a sound generator, and where the message includes an audio portion played on the sound generator, and the location where the assigned identifier is stored is in a title to the message file.

4. The method of claim 1 further comprising:
   repeating the steps of storing, assigning and retrieving for additional messages to be communicated to the game player at the occurrence of the predefined action in the game, where the additional messages communicate information concerning the object associated with the predefined action, and where each identifier includes a sequence designation that identifies the order in which its message is to be communicated.

5. The method of claim 1 where the identifier includes a mnemonic that identifies the object associated with the predefined action.

6. The method of claim 5 where the mnemonic is a noun identifying the object.

7. The method of claim 1 where the identifier includes a first mnemonic that identifies the object associated with the predefined action and a second mnemonic that identifies the operation associated with the predefined action.

8. The method of claim 7 where the second mnemonic is a verb that identifies the operation.

9. The method of claim 1 where the identifier includes a first mnemonic that identifies the object associated with the predefined action and second mnemonic that identifies a state of progression of the game.

10. The method of claim 1 further comprising:
    repeating the steps of storing, assigning and retrieving for additional messages to be communicated to the game player at the occurrence of the predefined action in the game where each identifier includes a mnemonic that identifies the object associated with the predefined action and a sequence designation that identifies the order in which its message is to be communicated.

11. The method of claim 1 where the identifier includes a first mnemonic that identifies the object associated with the predefined action, a second mnemonic that identifies the operation association with the predefined action and a third mnemonic that identifies a state of progression of the game.

12. The method of claim 1 further comprising:
    repeating the steps of storing, assigning and retrieving for additional messages to be communicated to the game player at the occurrence of the predefined action in the game where each identifier includes a first mnemonic that identifies the object associated with the predefined action, a second mnemonic that identifies the operation associated with the predefined action and a sequence designation that identifies the order in which the respective messages are to be communicated.

13. The method of claim 1 further comprising:
    repeating the steps of storing, assigning and retrieving for additional messages to be communicated to the game player at the occurrence of the predefined action in the game where each identifier includes a first mnemonic that identifies the object associated with the predefined action, a second mnemonic that identifies the operation associated with the predefined action, a third mnemonic that identifies a state of progression of the game and a sequence designation that identifies the order in which the respective messages are to be communicated.

14. The method of claim 1 wherein the object associated with the predefined action is a character intended to communicate messages to the game player, the method further comprising:

assigning a label to the message to identify the character intended to communicate the message, and displaying a visual image on the display screen that identifies the character intended to communicate the message when the message is communicated.

15. An apparatus, used to translate a message to be communicated to a player of an interactive computer game at the occurrence of a predefined action in the game, the apparatus comprising:

a computer system having a display screen, memory containing a code file and a message file, and an input device, software code, stored in the code file, for controlling the apparatus, a visual display produced by the software code and displayed on the display screen when the apparatus is used, a first area within the visual display where the message is displayed, a translation area within the visual display where a translation of the message may be produced by inputing the translation through the input device, and instructions within the software code for assigning an identifier to the message and to the translation.

16. An interactive computer game designed for play on a computer system having a display screen, an input device and a cursor displayed on the display screen and controlled at least in part by the input device, the game comprising:

memory containing a code file and a message file separate from the code file, software code which defines the play of the game, which causes objects to be displayed graphically on the display screen, which defines operations a game player may perform during the game, which allows the game player to perform a predefined action in the game by selecting an operation, positioning the cursor adjacent an object on the display screen and then inputing a predetermined signal through the user input device to perform the selected operation on the object, and which is stored in the code file, a message, stored in the message file, to be communicated to a game player at the performance of the predefined action, where the message communicates information concerning the object associated with the predefined action, and an identifier assigned to the message to distinguish the message from other messages and to relate the message to the predefined action, where the identifier is stored in the message file or in the title to the message file and incorporated in the software code instead of the message itself, where the software code further includes instructions to retrieve the message from the message file and communicate the message to the game player at the performance of the predefined action in the game by retrieving and communicating the message to which the identifier incorporated in the code is assigned.

17. A computer-implemented method of creating an interactive computer game designed for play on a computer system having a display screen, an input device, and a cursor displayed on the display screen and controlled at least in part by the input device, the method comprising:

providing software code which defines the play of the game, which defines an action a game player may perform during the game, and which allows the player to perform the action in the game by audibly voicing sounds identifying the action, where the user input device receives and recognizes the sounds and triggers the action, incorporating in the software code the assigned identifier instead of the message itself, providing memory accessible by the computer system, where the memory includes a code file and a message file which is separate from the code file, storing the software code in the code file, producing a message to be communicated to the game player at the occurrence of the action in the game, assigning an identifier to the message to distinguish the message from other messages and to relate the message to the action, storing the message in the memory in the message file and storing the message's assigned identifier in a location in the memory that is related to the message and is separate from the code file, and inserting into the software code instructions to produce the message from the message file and communicate the message to the game player at the occurrence of the action in the game by retrieving and communicating the message to which the identifier incorporated in the code is assigned.

* * * * *